United States Patent
Edrich et al.

(10) Patent No.: US 6,938,926 B2
(45) Date of Patent: Sep. 6, 2005

(54) SAFETY DEVICE FOR A COMFORTABLE SEAT

(75) Inventors: Hans Edrich, Heltersberg (DE); Gerhard Flory, Annweiler (DE); Guenter Franzmann, Rockenhausen (DE); Thomas Geisel, Rottenburg (DE); Ralf-Henning Schrom, Rottenburg (DE)

(73) Assignee: DaimlerChrysler AG, Stuttgart (DE)

( * ) Notice: Subject to any disclaimer, the term of this patent is extended or adjusted under 35 U.S.C. 154(b) by 111 days.

(21) Appl. No.: 10/371,817

(22) Filed: Feb. 21, 2003

(65) Prior Publication Data

US 2003/0164610 A1 Sep. 4, 2003

(30) Foreign Application Priority Data

Mar. 4, 2002 (DE) ......................................... 102 09 235

(51) Int. Cl.[7] .......................... B60R 22/46; B60R 22/36
(52) U.S. Cl. ........................................ 280/806; 297/480
(58) Field of Search ............................. 280/806, 808; 297/480, 482, 483; 60/638

(56) References Cited

U.S. PATENT DOCUMENTS

| | | | | |
|---|---|---|---|---|
| 3,291,526 A | * | 12/1966 | Nicholas ...................... | 280/807 |
| 3,756,339 A | * | 9/1973 | Cornelison et al. .......... | 297/477 |
| 3,811,703 A | * | 5/1974 | Turkovich .................... | 297/474 |
| 3,823,978 A | * | 7/1974 | Dove ........................... | 297/476 |
| 4,006,934 A | | 2/1977 | Murakami et al. | |
| 4,008,909 A | | 2/1977 | Otani et al. | |
| 4,199,190 A | * | 4/1980 | Lindblad .................. | 280/801.1 |
| 4,767,161 A | | 8/1988 | Sedlmayr et al. | |
| 5,098,162 A | * | 3/1992 | Forget et al. ............... | 297/482 |
| 5,725,249 A | * | 3/1998 | Nishide et al. ............. | 280/806 |
| 5,845,939 A | | 12/1998 | Greiner et al. | |
| 5,971,491 A | | 10/1999 | Fourrey et al. | |
| 6,095,615 A | * | 8/2000 | Wier ........................... | 297/480 |
| 6,126,241 A | * | 10/2000 | Wier ........................... | 297/482 |
| 6,357,795 B1 | * | 3/2002 | Krauss et al. ............... | 297/482 |
| 2002/0190515 A1 | | 12/2002 | Birk et al. | |
| 2003/0137140 A1 | * | 7/2003 | Lutz et al. .................. | 280/806 |
| 2004/0212188 A1 | * | 10/2004 | Terasaki ..................... | 280/806 |

FOREIGN PATENT DOCUMENTS

| | | |
|---|---|---|
| DE | 2 223 061 | 11/1973 |
| DE | 2 249 786 | 4/1974 |
| DE | 2 409 159 | 9/1974 |
| DE | 2 409 943 | 9/1974 |
| DE | 35 18 121 | 11/1986 |
| DE | 296 06 896 U | 9/1996 |
| DE | 296 20 297 | 4/1997 |
| DE | 198 02 346 | 7/1998 |
| DE | 201 10 046 U | 12/2001 |
| DE | 202 00 741 U | 7/2002 |
| EP | 0 850 810 | 7/1998 |
| WO | 98/29282 | 7/1998 |

* cited by examiner

*Primary Examiner*—Paul N. Dickson
*Assistant Examiner*—Joselynn Y. Sliteris
(74) *Attorney, Agent, or Firm*—Kenyon & Kenyon

(57) ABSTRACT

In order to provide a safety device for a comfortable seat having a seat surface and a backrest which may be transferred from a sitting position into a resting position and vice versa, the safety device being used to increase the safety of vehicle occupants on the comfortable seat, the comfortable seat includes with a seat belt system which includes a belt strap which is fixed in the region of the seat surface via a belt end fitting and is stored on a belt-retracting mechanism arranged in the upper region of the backrest, a belt buckle being provided on that side of the seat surface which is opposite the belt end fitting so as to couple up the belt strap via a belt tongue in accordance with a three-point belt system, and, in the event of an accident, the belt strap being tightened via the belt-retracting mechanism and a pretensioning system engaging on the belt end fitting.

23 Claims, 4 Drawing Sheets

SAFETY DEVICE FOR A COMFORTABLE SEAT

CROSS-REFERENCE TO RELATED APPLICATIONS

The present application claims priority to Application No. 102 09 235.4, filed in the Federal Republic of Germany on Mar. 4, 2002.

FIELD OF THE INVENTION

The present invention relates to a safety device for a comfortable seat.

BACKGROUND INFORMATION

The development of seats, in particular of vehicle seats, involves, among other things, the attaining of the greatest possible seat comfort because the occupants, under some circumstances, spend many hours relatively immobile on the seat. It is therefore desirable if vehicle seats provide the option for vehicle occupants to rest on them. What are known as "comfortable seats", for example, provide this option. Seats of this type include a seat surface and a backrest which can be transferred from a sitting position into a resting position and vice versa. The sitting position is distinguished by an essentially vertical position of the backrest—for example, approximately 25° with respect to a perpendicular—and a correspondingly coordinated position of the seat surface, so that a vehicle occupant takes up an upright position. In contrast, in a resting position the backrest is inclined to a relatively pronounced extent, so that the occupant takes up a resting position similar to reclining.

In the case of an accident, there is the problem, in particular in the resting position, that a vehicle occupant is not restrained sufficiently despite having put on the seat belt. He/she may dive below the belt straps due to his/her position which is similar to reclining. This is called the "submarining effect".

It is conventional to provide a three-point belt system for a normal vehicle seat with a plurality of belt tighteners, in order to increase the occupant's safety. For example, reference is made to German Published Patent Application No. 24 09 159, which describes a safety system for a motor vehicle seat, in which a three-point belt is tightened by three servomotors. The motors engage on the belt end fitting, on the belt buckle and on the belt-retracting mechanism and are activated in the case of an accident, as a result of which the belt strap is tightened. This tightening removes any belt slack which may be present and thus reduces the free play permitted by the seat belt, so that a vehicle occupant is restrained as immediately as possible.

An object of the present invention is to provide a safety device for a comfortable seat, which device may increase the safety of vehicle occupants.

SUMMARY

The above and other beneficial objects of the present invention may be achieved by providing a safety device as described herein.

An example embodiment of the present invention may provide a seat belt system that may be specially adapted to the characteristic features of a comfortable seat. A comfortable seat having a seat surface and a backrest may take up both a sitting position and a resting position. Between these extreme positions, it may also take up all of the intermediate positions. After a certain angle of inclination of the backrest, the seat surface is raised. The raising may take place via a seat control system or via a correspondingly shaped guide rail. As already mentioned, the sitting position is provided by an essentially vertical position of the backrest while, in a resting position, the backrest takes up a position with a more pronounced inclination. In order to ensure optimum safety for the vehicle occupant in all of these possible positions, e.g., the positions having a more pronounced inclination of the backrest, a seat belt system is provided which includes a belt strap which is coupled up by one end in the region of the seat surface and the other end of which is stored in a belt-retracting mechanism. The belt strap is configured as a three-point belt system by a belt buckle, which is arranged on that side of the seat surface which is opposite the coupling-up point of the belt strap and interacts with a buckle tongue assigned to the belt strap. In the event of an accident, the belt strap is tightened, according to the present invention, at two points. One part of the tightening takes place via the belt-retracting mechanism, it being used to tighten that region of the belt strap which extends over the shoulder of the occupant. The other part of the tightening takes place via the belt end fitting. This may effectively tighten that region of the belt strap which extends over the lap of the occupant.

The tightening of the lap belt may provide the effect that the vehicle occupant is drawn into the vehicle seat via the lap belt, which acts on his/her hip bones, which may prevent him/her from diving below the belt strap. The tightening of the shoulder belt may additionally press the entire upper part of the vehicle occupant's body against the backrest, as a result of which, firstly, the upper part of the body may be prevented from pivoting forwardly and, secondly, may also be prevented from diving below the belt strap. The combination of these two tightening methods may result in a safety device for comfortable seats, which may be effective and therefore may considerably increase the safety of vehicle occupants.

The belt-retracting mechanism may be integrated in the backrest. An integral seat of this type may provide a number of advantages. It may be possible to arrange the comfortable seat anywhere in the vehicle independently of the surroundings. It may not be necessary to arrange the seat, for example, directly next to a B-pillar which may accommodate the retracting mechanism. It may be provided that irrespective of the position of the comfortable seat and the position of the backrest, the belt strap may always take up the same profile relative to the vehicle occupant on the comfortable seat.

The belt-retracting mechanism may also be arranged independently of the seat. This may provide that the dimensions of the comfortable seat may not have to be configured such that they have to accommodate a belt-retracting mechanism. This may save constructional space in the seat which may be used for other constructional units.

The tightening of the lap belt may take place via a pretensioning system which engages on the end fitting and is arranged below the seat surface of the comfortable seat. The arrangement of the pretensioning system below the seat surface may be appropriate because space may be available there, so that the pretensioning system may be integrated in the vehicle in a visually inconspicuous manner. In addition, the belt end fitting may be readily accessible from there.

If the pretensioning system is arranged below the seat surface between two seat-adjusting rails and is connected to the comfortable seat, then it may be possible to displace the seat jointly together with the pretensioning system. This may ensure that the pretensioning system may always take up the same position relative to the belt end fitting, on which it engages. Adjustable connecting elements between the pretensioning system and end fitting may thus not be necessary. As a result, reliable functioning of the safety device according to the present invention may be ensured.

The pretensioning system may, for example, have a pyrotechnic triggering unit. This may provide that it may be triggered rapidly, as a result of which the tightening times may be optimized and as a result of which the safety for vehicle occupants may be increased considerably. However, it is also possible to use other triggering units, such as, for example, an electric motor.

The pretensioning system may have an introductory funnel through which the belt strap is guided into the pretensioning system. The funnel may ensure that the belt strap may be moved during the tightening process in an error-free manner in the direction of the pretensioning system, so that the tightening process may not be adversely affected and reliable tightening may take place.

A connecting element may be provided between the belt end fitting of the belt strap and the triggering unit. This connecting element may include a wire cable. A cable of this type may reliably transmit the tensile forces introduced by the triggering unit into the connecting element. Any other type of connecting element which reliably carries out this task may also be possible.

The pretensioning system may also have damping elements which may avoid the formation of noise. A damping element of this type may, for example, include a plastic clip which keeps apart parts moving relative to one another or presses them against one another and therefore suppresses the formation of noise. However, other damping elements which damp noises and at the same time may ensure a disturbance-free tightening process in the pretensioning system may also be used.

According to an example embodiment of the present invention, the tightening system is of integral design with the belt buckle. This example embodiment may provide that it may be completely preassembled, which may have a positive effect on the installation times. Furthermore, this example embodiment may be suitable for reliably absorbing the forces acting on the belt buckle and the belt end fitting during the crash. However, the belt buckle may also be fixed releasably on the tightening system, for example, may be screwed on. It is also possible for the tightening system and belt buckle to be arranged independently of each other.

The present invention is explained in greater detail in the following description with reference to the exemplary embodiment, which is illustrated in the drawings.

DETAILED DESCRIPTION

Figure 1:
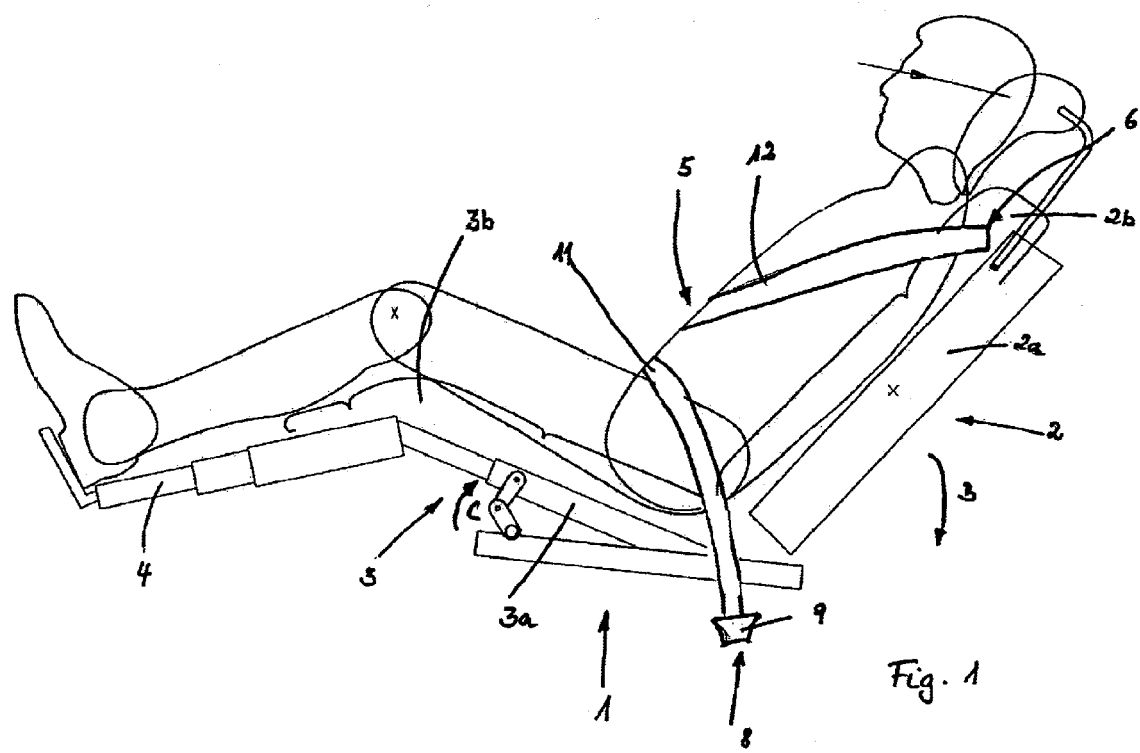
FIG. 1 is a schematic side view of a comfortable seat in a resting position with a seat belt system according to the present invention.

FIG. 1 schematically illustrates a comfortable seat 1 in a resting position together with a vehicle occupant. The comfortable seat 1 includes a backrest 2 and a seat surface 3. The seat surface 3 is adjoined by a footrest 4. Both the backrest 2 and the seat surface 3 in each case include a frame 2a or 3a and a cushion 2b or 3b, respectively.

At this point, the individual components of the seat will not be discussed more specifically. Only the resting position is to be described. This is provided by the backrest 2 being inclined-in comparison to the sitting position in accordance with the arrow B. In this illustration, it takes up an angle of inclination with respect to the horizontal of approximately 45°. The seat surface 3 is pivoted according to the arrow C from a sitting-position into a resting position. The footrest 4, which adjoins the seat surface 3, executes a pivoting movement and, if appropriate, an extension movement. This results in the option for a vehicle occupant on the comfortable seat of taking up a resting/reclining position. This option makes it possible to relax, as a result of which the comfort during traveling may be considerably increased.

The safety device according to the present invention of the comfortable seat will be explained in greater detail in the following. FIG. 1 illustrates a seat belt system 5. The latter has a belt strap which is coupled up at three points 6, one point of which is arranged behind the seat from the viewpoint of the person looking at it. One point 6 is arranged at the upper end of the backrest 2. A belt-retracting mechanism which stores the belt strap is arranged in the backrest. A further point 8 is arranged under the seat surface 3 in the region at which the seat surface 3 and backrest 2 butt against each other. The belt strap is fixed at the point 8 via a belt end fitting 9. The third point is formed by a belt buckle. The belt strap is connected to the belt buckle via a belt tongue. The third point defines the belt strap into two regions: a lap belt 11, which extends from the belt end fitting 9 as far as the belt buckle, and a shoulder belt 12, which extends from the belt buckle to the belt-retracting mechanism 6.

Figure 2:
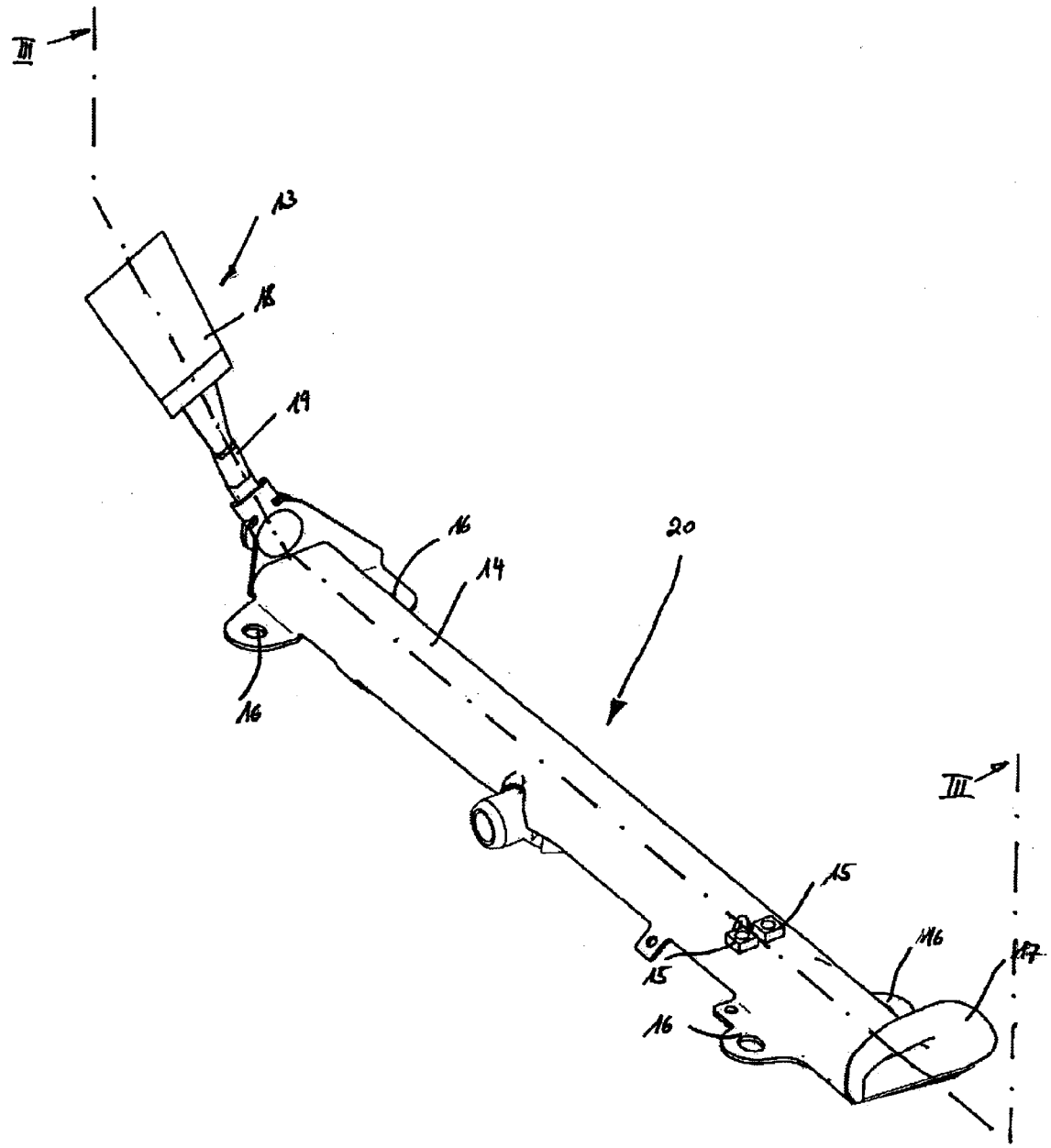
FIG. 2 is a three-dimensional view of a pretensioning system that is used in the case of the seat belt system according to the present invention.

The belt end fitting 9 is integrated in a pretensioning system 20, which is illustrated in FIG. 2. The pretensioning system 20 is arranged below the seat surface 3, e.g., between the point 8 and the belt buckle 13. In FIG. 2, the pretensioning system 20 is illustrated from the outside, and a covering 14 may be seen. The covering 14 is provided with a plurality of fixing devices, for example, nuts 15 and recesses 16. The pretensioning system 20 may be secured via these. Furthermore, an introductory funnel 17 may be seen in FIG. 2. The belt strap is guided through the introductory funnel 17 into the interior of the pretensioning system 20 as far as the belt end fitting 9. The function of the introductory funnel 17 is explained below in conjunction with the function of the entire pretensioning system 20.

The belt buckle 13 is arranged on that side of the pretensioning system 20 which is opposite the introductory funnel 17. The belt buckle has a receiving element 18 for receiving the belt tongue and a connecting element 19 for connecting the buckle 13 to the pretensioning system 20.

Figure 3:
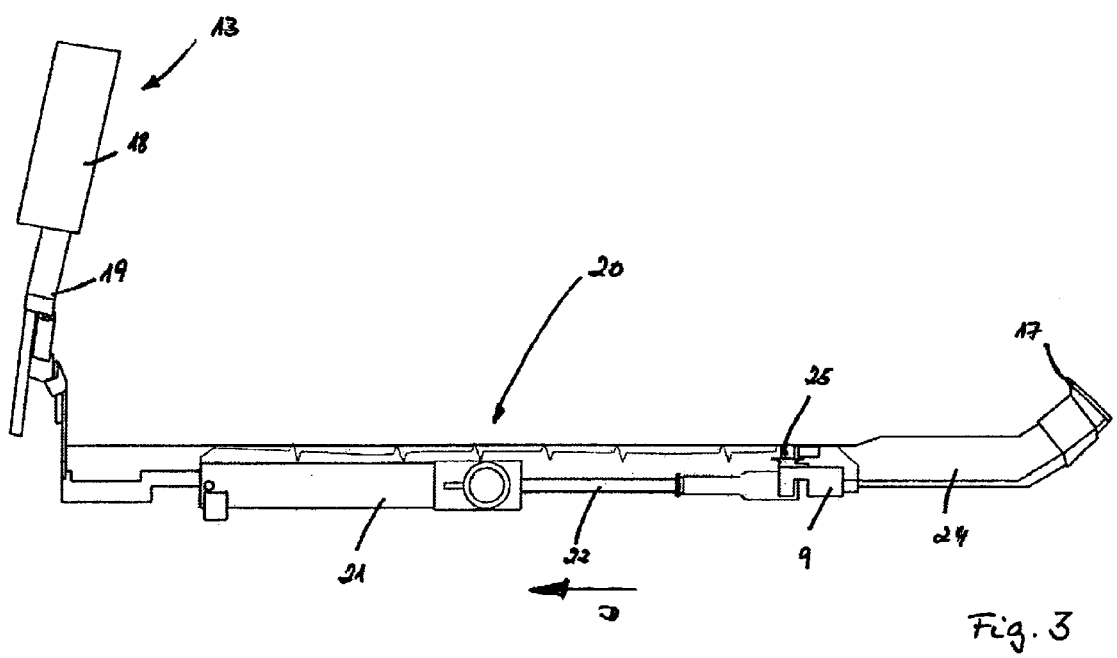
FIG. 3 is a cross-sectional view of the pretensioning system taken along the line III—III illustrated in FIG. 2.
Figure 4:
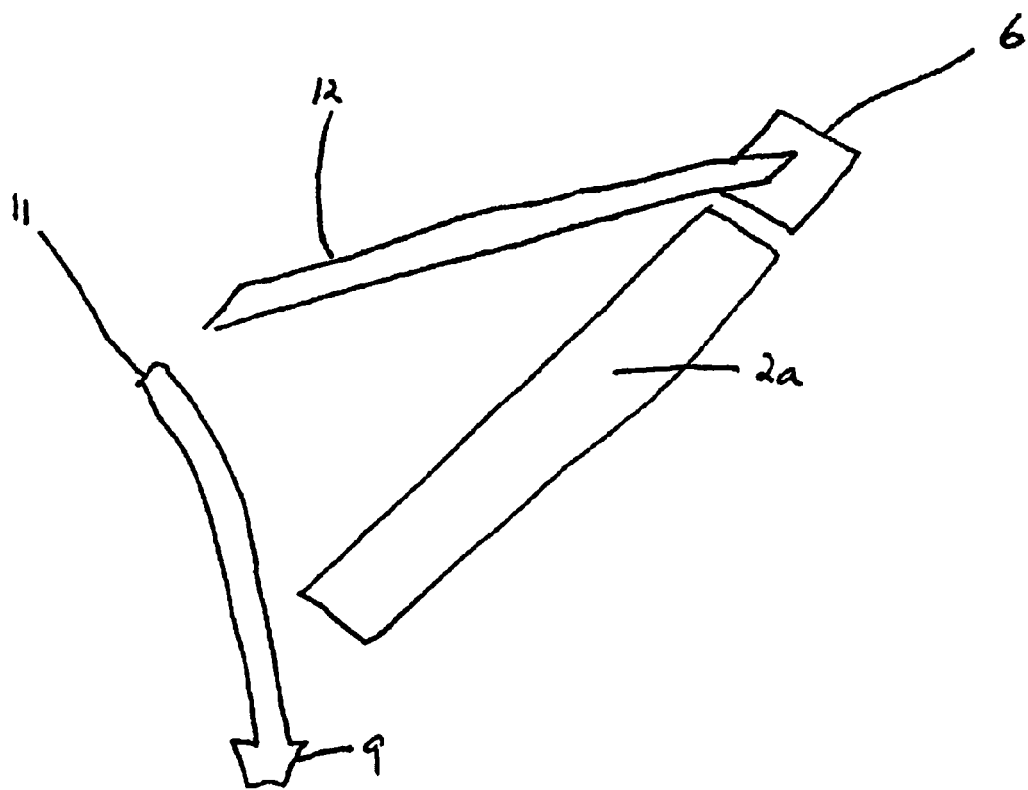
FIG. 4 is a schematic side view of a backrest for a comfortable seat and belt-retracting mechanism, in which the belt-retracting mechanism is arranged independently of the backrest.

The individual components of the pretensioning system 20 are illustrated in FIG. 3. A pyrotechnic triggering unit 21 is arranged on the left-hand side. The triggering unit 21 acts on a connecting element 22 which may be, for example, a steel cable. The connecting element 22 acts on the end fitting 9 which is connected to the belt strap, namely the belt strap of the lap belt 11. In the pretensioning system 20, the belt strap extends in a guide 24 as far as the end fitting.

In order to suppress the formation of noise, a damping element 25 may be provided in the pretensioning system 20.

This damping element 25 either keeps the parts moving relative to one another apart or presses them together. In this manner, a noise-generating movement between these parts may no longer be possible, as a result of which the noises are suppressed. The damping element 25 may consist, for example, of plastic and may have the form of a clip.

If an accident or a hazardous driving situation is detected, the pyrotechnic triggering unit 21 is activated, as a result of which the connecting element 22 is moved within a few milliseconds in the direction of the arrow D. As soon as the connecting element 22 has taken up an end position, it is secured via suitable locking arrangement. The belt end fitting 9 is also moved in the direction of the arrow D by the connecting element 22. As a result, in turn, the belt strap is drawn through the introductory funnel 17 into the pretensioning system 20.

This belt tightening firstly has the effect that any belt slack which is present in the lap belt is removed. On further tightening, the vehicle occupant is drawn into the comfortable seat 1. This prevents the occupant from being able to slip under the lap belt.

In the exemplary embodiment illustrated, 100 mm are provided for the displacement path. Any other desired lengths of displacement paths are also possible depending on the construction space and arrangement of the pretensioning system 20.

Combined with the additional tightening of the shoulder belt 12 via a belt-retracting mechanism arranged at 6, a safety device is made available which, in the event of an accident, gives rise to a reliable restraint action, as result of which the safety for the vehicle occupants on a comfortable seat may be considerably increased in any positions, e.g., resting positions.

What is claimed is:

1. A safety device for a comfortable seat, comprising:
   a seat surface;
   a backrest transferable between a sitting position and a resting position;
   a seat belt system including a belt-retracting mechanism arranged in an upper region of the backrest, a belt strap fixed in a region of the seat surface via a belt end fitting and stored on the belt-retracting mechanism, and a belt buckle on a side of the seat surface opposite the belt end fitting configured to couple the belt strap via a belt tongue in accordance with a three-point belt system; and
   a pretensioning system engaged on the belt end fitting;
   wherein the belt-retracting mechanism and the pretensioning system are configured to tighten the belt strap in the event of an accident, the pretensioning system configured to tighten the belt strap by retraction of the belt strap only at the belt end fitting side of the belt strap.

2. The safety device according to claim 1, wherein the belt-retracting mechanism is arranged in the backrest.

3. The safety device according to claim 1, wherein the belt-retracting mechanism is arranged independently of the comfortable seat.

4. The safety device according to claim 1, wherein the pretensioning system is configured to tighten at the belt end fitting, the pretensioning system arranged below the seat surface.

5. The safety device according to claim 1, wherein the pretensioning system is arranged between two seat-adjusting rails arranged below the seat surface.

6. The safety device according to claim 1, wherein the pretensioning system includes a pyrotechnic triggering unit.

7. The safety device according to claim 1, wherein the pretensioning system includes an introductory funnel.

8. The safety device according to claim 6, wherein the pretensioning system includes a connecting element between the triggering unit and the belt strap.

9. The safety device according to claim 1, wherein the pretensioning system includes at least one damping element.

10. The safety device according to claim 1, wherein the pretensioning system is integral with the belt buckle.

11. The safety device according to claim 1, wherein the belt-retracting mechanism is arranged in the upper region of the backrest when the backrest is in the resting position.

12. A safety device for a reclinable seat, comprising:
    a seat surface;
    a backrest transferable between a sitting position and a reclined position;
    a seat belt system including a belt-retracting mechanism arranged in an upper region of the backrest, a belt strap fixed in a region of the seat surface via a belt end fitting and stored on the belt-retracting mechanism, and a belt buckle on a side of the seat surface opposite the belt end fitting configured to couple the belt strap via a belt tongue in accordance with a three-point belt system; and
    a pretensioning system engaged on the belt end fitting;
    wherein the belt-retracting mechanism and the pretensioning system are configured to tighten the belt strap in the event of an accident, the pretensioning system configured to tighten the belt strap by retraction of the belt strap only at the belt end fitting side of the belt strap.

13. The safety device according to claim 12, wherein the belt-retracting mechanism is integrated in the backrest.

14. The safety device according to claim 12, wherein the belt-retracting mechanism is arranged independently of the reclinable seat.

15. The safety device according to claim 12, wherein the pretensioning system is configured to tighten at the belt end fitting, the pretensioning system arranged below the seat surface.

16. The safety device according to claim 12, wherein the pretensioning system is arranged between two seat-adjusting rails arranged below the seat surface.

17. The safety device according to claim 12, wherein the pretensioning system includes a pyrotechnic triggering unit.

18. The safety device according to claim 12, wherein the pretensioning system includes an introductory funnel.

19. The safety device according to claim 17, wherein the pretensioning system includes a connecting element between the triggering unit and the belt strap.

20. The safety device according to claim 12, wherein the pretensioning system includes at least one damping element.

21. The safety device according to claim 12, wherein the pretensioning system is integral with the belt buckle.

22. The safety device according to claim 12, wherein the belt-retracting mechanism is arranged in the upper region of the backrest when the backrest is in the reclined position.

23. The safety device according to claim 1, wherein the pretensioning system extends from the belt end fitting to the belt buckle, and the belt buckle is fastened to the pretensioning system.

* * * * *